July 10, 1956 W. F. GILLIAM 2,754,353
COMPOSITE ELECTRICAL INSULATION AND METHOD OF FABRICATION
Filed Sept. 20, 1952
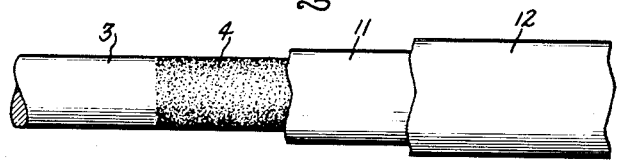
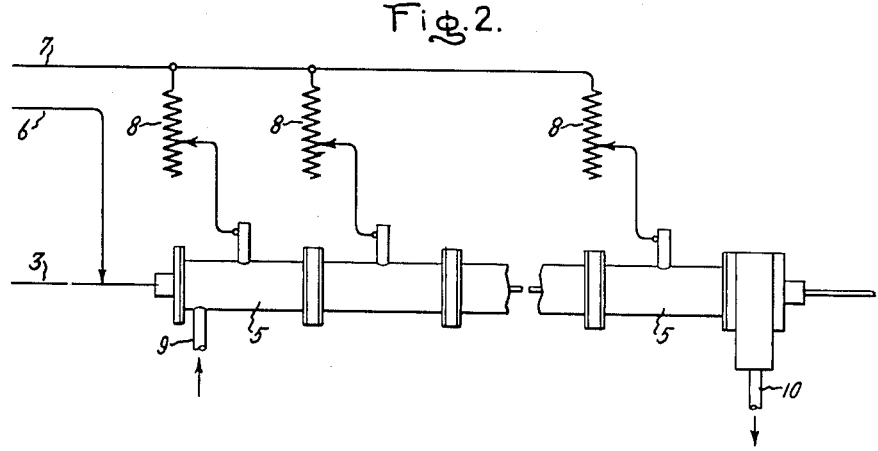
Inventor:
William F. Gilliam,
by Paul A. Frank
His Attorney.

United States Patent Office 2,754,353
Patented July 10, 1956

2,754,353

COMPOSITE ELECTRICAL INSULATION AND METHOD OF FABRICATION

William F. Gilliam, Schenectady, N. Y., assignor to General Electric Company, a corporation of New York Application September 20, 1952, Serial No. 310,580

6 Claims. (Cl. 174—120)

The present invention relates to insulated electric conductors and comprises improved electric insulation which is particularly well adapted for insulating magnet wire and is suitable for use in motors, generators, transformers and other electric apparatus.

Magnet wire includes not only conductors of round cross-section but also a variety of other cross-sectional forms, including, for example, rectangular wires, and wires having a flat nearly ribbon-like configuration. Insulation for magnet wire must have exceptionally good electrical insulating and mechanical properties. When sharp edges are present in rectangular shaped wire this requirement is more difficult of achievement than it would be in round wire. Magnet wire must withstand rough handling, for example, by being bent and twisted into complex shapes or by bundles of magnet wire conductors being driven into slots in the assembly of electric apparatus. Thus, the insulation of magnet wire must have exceptional ruggedness and high resistance to abrading forces. Furthermore, as the space occupied by the insulated conductor must be as small as possible in stators, rotors, and other magnetic members of electric devices, it is important that magnet wire insulation should have only the minimum thickness consistent with required good insulating and rugged physical properties. Also, it is desirable that magnet wire should be capable in some instances of withstanding relatively high temperature, say temperatures in the range of 150° to 250° C., without undergoing appreciable deterioration.

By the present invention, magnet wire having the above-mentioned and other desired properties has been provided with an improved electrical insulation comprising a combination of resinous materials, namely, an undercoat stratum comprising an organopolysiloxane resin (herein also referred to as silicone resin) and an abrasion resisting topcoat. Although the composition applied as a first coat may consist mainly of silicone resin, such coat preferably includes as a minor ingredient also an alkyd resin.

After the undercoat has been hardened or set by baking to a non-tacky state, a top coat of an abrasion-resisting resin is applied next, the latter resin being applied directly on the surface of the silicone resin coat. The polyvinyl acetal resin preferably applied is a polyvinyl formal resin modified with a phenol-formaldehyde resin, as described, for example, in Jackson and Hall Patent 2,307,588. More specifically, such combinations of resins are applied on magnet wire in an optimum relation of respective thicknesses of coatings, the silicone resin coat being from about 0.3 to 2.5 mils in thickness depending on the service requirements, and most commonly about one mil in thickness. The outer coating of modified polyvinyl formal resin may be about 0.1 to 0.5 mil in thickness, the preferred thickness being at 0.2 to 0.4 mil.

The application of the modified silicone resin and a modified polyvinyl acetal resin directly on a copper conductor would not result alone in the best combination of physical properties which can be achieved. Such respective undercoat and overcoat resins are applied preferably on copper wire which is coated initially with a film consisting of a selected form of copper oxide (hereinafter described). The presence of the oxide film improves the adhesion of the undercoat of silicone resin and contributes to the improvement of the properties of the combination of silicone resin and the overcoat of a phenol-aldehyde modified polyvinyl formal resin. Although in the preferred form of my invention a coating of copper oxide is interposed between a copper conductor and the herein-described insulation, I wish it to be understood that insulated conductors embodying my invention are not restricted to this preferred form. For example, many of the advantages of my invention will be obtained if other shielding means are interposed between a copper foundation and a superimposed insulation embodying my invention. For example, instead of a copper oxide layer, a layer of nickel may be interposed between a copper foundation and insulation embodying my invention. Preferably such coating of nickel is applied as described in U. S. patent application Ser. No. 299,684 of Hurd and Boldebuck, filed July 18, 1952, namely, by electrolytically depositing nickel on copper which has been given a roughened frosty or matte surface whereby the electrodeposited nickel assumes a similar frosty structure. Adhesion of a subsequently applied coating of polysiloxane resin is promoted by such surface condition.

The accompanying drawing shows diagrammatically in Fig. 1, and not to scale, a portion of an electric conductor having superimposed resin coatings in part removed to show their relationship; and Fig. 2 is a diagram of an apparatus for producing a coating of oxide on the wire to be resin coated.

The electric conductor 3 to be coated, which may be assumed to consist of copper, or at least to have a copper surface, is provided with an adherent coating 4 of copper oxide or nickel. The oxide coating may be produced by oxidation of copper in an alkaline solution by either one of two methods.

Method I.—Oxidation of the copper may occur by immersion in an aqueous solution of a strong alkali, such as sodium or potassium hydroxide, and an energetic oxidizing agent, for example, sodium chlorite or potassium chlorite. Oxidizers of this type are described in U. S. Patent 2,364,993 of December 12, 1944 and are obtainable on the market, one example being a material sold by Ethone, Inc. of New Haven, Connecticut, under the trade name "Ebonol-C."

Method II.—Preferably, however, the coat of copper oxide is produced by anodic oxidation in an electrolytic cell in an aqueous alkaline electrolyte as described in a copending application Serial No. 310,576, of Dallas T. Hurd, filed concurrently herewith and assigned to the same assignee as the present application, which by reference is made a part of the present application.

As described therein, a copper wire to be oxidized is caused to progress in a continuous manner through a series of electrolytic cells arranged sequentially in proximity to one another. Each of said cells comprises an electrolyte and a cathode adapted to cooperate with said wire functioning as a common anode. As shown in Fig. 2, the wire 3 is anodically coated with oxide in an electrolytic apparatus consisting of a number of electrolytic cells 5—5 part of which for the sake of simplifying the drawing have not been shown. The cells comprise tubular housings constituting cathodes. Unidirectional current is supplied by the conductors 6, 7 and by branch circuits containing adjustable resistances 8. The cells are supplied with a circulating aqueous solution of sodium hydroxide having a concentration in the range of about 17 to 35% by weight, at a temperature approximating 95 to 100° C. The electrolyte is circulated through a heating tank (not shown) by the conduits 9, 10. The impressed voltages vary in accordance with a predetermined pattern including (a) an oxidation initiating phase in one or more cells first entered by said wire wherein a voltage of about 0.4 volt is first applied, (b) the potential rising to an intermediate augmenting phase in a group of cells next traversed wherein at a potential of approximately one volt oxidation is carried substantially to completion and (c) a final phase wherein the oxide coating is subjected to a higher voltage, say from about 1.3 to 2 volts to improve and consolidate the oxide coating and to render the coating better adapted to function as a substratum for an insulating coating or coatings subsequently applied.

By either Method I or II, a unique blackish copper oxide is formed as a flexible and closely adherent film. This film may be properly described as being black, but may often show to some extent an olive drab hue. The film has considerable resilience and adheres so well to the copper base that the latter may be flexed without dislodging such oxide layer from the base. Such oxide film apparently comprises both cuprous and cupric forms of copper oxide, hydrated cupric oxide, and at times hydrated cuprous oxide. The external portion apparently is richer in cupric oxide than portions adjacent to the copper base. Films of plastic organic material not only adhere well to the copper oxide film formed by either of Method I or II, but surprisingly show a great improvement in abrasion resistance. Black copper oxide formed by either one of these methods is entirely different in its inherent properties from copper oxide formed by thermal air oxidation. The latter is unsuited for the purposes of my invention.

The film or coating of oxide 4 which constitutes a barrier between the copper base 3 and subsequently applied electrical insulation films 11 and 12 is firmly adherent to the copper, and its presence contributes to improved abrasion resistance and improved heat aging life of the insulated conductor. Polysiloxane resins in general are suitable for application on the oxide-coated copper wire, as, for example, resins described in Rochow U. S. Patents 2,258,218 through 2,258,222, all issued October 7, 1941, and in Welsh U. S. Patent 2,449,572, issued September 21, 1948. However, specific resins herein described are preferred. Polysiloxane resins contain attached to silicon atoms hydrocarbon radicals selected from the group comprising alkyl, aryl, alkaryl and aralkyl radicals, the hydrocarbon-to-silicon ratios being greater than 1 and less than 2, and commonly in the ratio of 1.2 to 1.8.

Preferably the resinous material chosen for application as undercoat for copper wire coated with copper oxide consists of silicone resin blended with a modified alkyd resin. The proportions of these two types of resin may vary by weight within the limits of about 60 to 90 parts of silicone resin and 40 to 10 parts of alkyd resin. The preferred proportion is about 80 parts of aryl-alkyl silicon resin and 20 parts of alkyd resin. A preferred alkyd resin comprises as starting ingredients glycerine, phthalic anhydride, a drying oil, and an oil-soluble phenol-aldehyde resin.

As a complete disclosure of my invention in its most specific aspect, the following illustrative examples are given, but I desire that the appended claims not be restricted to these specific examples.

*Example 1*

Copper wire having a nominal size of 0.0359" may be treated according to the procedure of Method II until a thin film of copper oxide of about 1.3 mg. per square cm. of surface area is produced. The term "mg. of copper oxide per square cm. of surface area" refers to the weight loss per unit area on immersing the anodized copper wire in concentrated hydrochloric acid for about 30 seconds. The loss is due to the solution of the copper oxides and would include both hydrated and anhydrous cuprous and cupric oxides, and cuprous and cupric hydroxides.

A silicon alkyd resin solution for undercoat is prepared containing the following ingredients:

(1) 80.0 gms. of methylphenylpolysiloxane resin
(2) 20.0 gms. of oil modified, phenol-aldehyde modified alkyd resin
(3) 2.7 gms. of curing catalyst (for example, zinc octoate)
(4) 230.7 gms. of solvent
(5) 333.4 gms. of solution (30% solids)

The organopolysiloxane resins which are suitable for the above purpose are described in the copending application of Welsh and Holdstock, Serial No. 210,094, filed February 8, 1951, now Patent No. 2,661,348, and being assigned to the same assignee as the present invention. These resins are prepared by hydrolyzing a mixture of organohalogenosilanes with a hydrolysis medium comprising water and a halogenated organic liquid, the latter to be a solvent for the mixture of organohalogenosilanes and the formed organopolysiloxane. A solvent should be used which has a specific gravity about 1.1 (preferably above 1.2) and a boiling point below 175° C., and being inert to the formed hydrogen halide, to the aforesaid organohalogenosilanes, and the formed organopolysiloxane. The organohalogenosilane composition dissolved in the halogenated organic liquid is added to the hydrolyzing water. The hydrolyzable mixture of organohalogenosilanes may comprise, for example, methyltrichlorosilane, phenyltricholorsilane, dimethyldichlorosilane and diphenyldichlorosilane. The proportions of these ingredients preferably should be in such a ratio that the organopolysiloxane resin derived therefrom has the total number of organic groups to silicon atoms within the range from 1 to 2 preferably from 1.2 to 1.8 (for instance total methyl and phenyl groups), per silicon atom.

The following specific example is illustrative of an organopolysiloxane resin which may be used in the practice of my invention.

An admixture or blend of the following organochlorosilanes in parts by weight will yield upon hydrolysis an organopolysiloxane resin suitable for the present purpose:

| | Parts |
|---|---|
| Methyltrichlorosilane | 78.0 |
| Phenyltrichlorosilane | 222.0 |
| Dimethyldichlorosilane | 67.5 |
| Diphenyldichlorosilane | 132.5 |

This admixture is hydrolyzed, for example, by adding this blend to 750 parts of trichloroethylene, and hydrolyzing with about 2000 parts of water at 35° C. while agitating. Hydrolysis should be continued for about one-half hour or until complete. Upon separation of the resin-containing solution from the remainder, most of the solvent content should be stripped therefrom by heating. The residue may be diluted to about 60% solids with xylene.

The above-mentioned Welsh et al. application gives other examples of organohalogenosilane compositions which can be employed as well as various hydrolyzing media, including various halogenated organic liquids which can be used as solvents for the organohalogenosilane and for the formed organopolysiloxane. In general, blends are preferred in which the phenylhalogenosilane is a substantial component. In view of the adequate disclosures in the Welsh et al. application, which by reference is made part of the present application, no further description of the process for making the organopolysiloxane resins therein disclosed will be given herein.

The second ingredient, namely, an alkyd resin combined with drying oil and modified with a phenol-aldehyde resin, may be prepared as follows:

(1) A monoglyceride-phenolic resin composition is formed as follows: first reacting by weight 38 parts of soya oil, 4 parts of an oil-soluble phenolic resin with 12.6 parts of glycerine to form a monoglyceride. Thereupon, by heat application, the resulting monoglyceride is reacted with 8.3 parts of glycerine, 31.8 parts of phthalic anhydride, and 0.5 part of fumaric acid. The latter ingredient, however, is dispensable. Heating is continued to an acid value of about 10.

To the second stage product about 3.8 parts of phthalic anhydride are added, and reaction is continued until the hot plate cure at 200° C. is about 11 seconds. The product may be dissolved in equal parts by weight of xylene.

Using equipment and procedures well known in the art, the anodized copper wire is led into a container of a silicone-alkyd resin solution containing the above ingredients, and thence into a heated tower, out of the tower and again into the solution, and thence into the tower, etc., until a total of three coats of silicone-alkyd resin have been applied to the anodized copper wire. The speed of the wire and the temperature of the tower are so adjusted that the solvent is gradually removed from the resin, and finally the resin is baked to a hardened and set state at a temperature around 240–280° C. About 0.7 mil thickness (expressed on the radius) of electrical insulation comprising a silicone-alkyd resin containing a preponderant quantity of methylphenylpolysiloxane resin is applied to the anodized copper wire.

Upon the hardened non-tacky undercoat thus obtained a viscous solution of a phenol-aldehyde modified polyvinyl formal resin is applied. The previously coated and baked silicone-enameled anodized copper wire is passed through the enameling and baking equipment in such a manner that two layers of a phenol-aldehyde modified polyvinyl formal resin are applied as a top coat. Two self-centering dies are used in applying this top coat as taught in the Alexay U. S. Patent 2,238,575. The baking temperature is in the same range of 240–280° C.

A wire prepared in such a fashion having a thickness of insulating coating of about one mil has a high degree of flexibility and abrasion resistance. No cracking or crazing is observable when samples are wound on their own diameter, three times their diameter and five times their diameter and examined under a microscope at about 10 magnification. Its dielectric strength is high, being at least 2000 volts per mil. When wire thus coated is tested by a General Electric Repeated Scrape Tester (Cat. 5120403G1) at 400 g. load, an average of 29 abrasion strokes is required to abrade through the insulation.

A cut-through test to which insulated wire is subjected gives the temperature at which short-circuiting occurs when a load of 1000 gms. is applied at the point of crossover of two crossed wires, 110 volts AC is applied to the wires, and the samples are heated in an oven until failure occurs. Wires insulated as above described resisted cut-through up to a temperature of 118° C.

*Example 2*

Copper wire of a nominal size of 0.0453" may be treated according to the procedure of oxidizing Method II until a thin adherent film of copper oxide of about 1.6–1.8 mg. per square cm. of surface area is obtained. A silicone-alkyd resin solution for undercoat is prepared containing the following ingredients which were described in connection with Example 1 in approximately the following proportions:

147.0 gms. of a methylphenylpolysiloxane resin
37.2 gms. of an oil-modified, phenol-aldehyde modified alkyd resin
5.0 gms. of a curing catalyst
410.8 gms. of solvent
600.0 gms. of solution (31% of solids)

Both undercoat and overcoat enamels may be applied in a continuous operation using the same heated space for baking the enamels, that is, the application of the undercoat and top coat resins may occur by coordinate operations without the use of separate ovens and without collection of the wire after the application of the undercoat. The speed and the baking temperature may be so adjusted and the travel of the wire in the oven so arranged that a speed of about 12 feet per minute causes each coat to be baked approximately 50 seconds at a temperature of about 270 to 310° C. The wire requires about 40 seconds to attain this temperature.

Assuming three coats of the silicone-alkyd resin to be applied as an undercoat and two coats of a phenol-formaldehyde modified polyvinyl formal resin to be applied as a topcoat, a thickness of the total insulation of about 0.9 to 1.2 mils may be employed of which the topcoat resin should contribute about 0.2 to 0.4 of a mil to obtain best results.

Insulated wire thus prepared had a high abrasion resistance, a high degree of flexibility, and a high degree of resistance to solvents. No cracking or crazing was observed when the wire was wound on five times its own diameter and observed under a microscope at about 10 magnifications.

A dielectric strength of 1200 volts per mil or better was indicated by tests. The abrasion as tested by the same abrasion tester was about the same as stated in connection with Example 1. The cut-through was higher, namely, above 210° C. Wire aged for 48 days at 200° C. had at the end of this time a dielectric strength of 200 volts/mil, determined at 200° C.

This wire has been used in electrical equipment which has been successfully operated at temperatures around 300° C.

*Example 3*

Other abrasion resisting coating materials may be applied as a top coat. For example, a wire coated with a silicone-alkyd resin applied over oxide-coated wire prepared as above described was coated externally with an outer insulation coat consisting of two layers of a polyamide. For example, a nylon wire enamel obtainable from E. I. du Pont de Nemours under the designation VGT 8093 may be used. The thickness, expressed on the radius, of the silicone-alkyd undercoat was 0.7 to 0.8 mil. The thickness of the polyamide outer coat was 0.3 to 0.4 mil. No cracking or crazing of such wire could be observed under a microscope at about 10 magnifications when the coated wire was wound on mandrels respectively three times its diameter and five times its diameter. The dielectric strength is 2800 volts per mil. The abrasion resistance using the same test apparatus at 300 gram load was an average of 39 strokes. The cut-through temperature was 220° C.

What I claim as new and desire to secure by Letters Patent of the United States is:

1. A magnet wire comprising (*a*) a copper conductor, (*b*) a copper oxide layer on said conductor prepared by anodic oxidation of said conductor in aqueous alkaline solution, (*c*) a layer of a modified silicone resin bonded to said oxide layer, said modified silicone resin comprising a mixture of a major portion of a hydrocarbon-substituted polysiloxane resin and a minor portion of an oil-phenol-aldehyde modified alkyd resin, and (*d*) a layer of a phenol-aldehyde modified polyvinyl acetal resin bonded directly to said modified silicone resin layer.

2. A magnet wire comprising (*a*) a copper conductor, (*b*) a copper oxide layer on said conductor prepared by anodic oxidation of said conductor in an aqueous alkaline solution, (*c*) a layer of a modified silicone resin bonded to said oxide layer, said modified silicone resin comprising a mixture of about 80 per cent by weight of a hydrocarbon-substituted polysiloxane resin and about 20 per cent by weight of an oil-phenol-aldehyde modified alkyd resin, and (*d*) a layer of a phenol-aldehyde modified polyvinyl acetal resin bonded directly to said modified silicone resin layer.

3. A magnet wire comprising (*a*) a copper conductor, (b) a copper oxide layer on said conductor prepared by anodic oxidation of said conductor in aqueous alkaline solution, (c) a layer of a modified silicone resin bonded to said oxide layer, said modified silicone resin comprising a mixture of a major portion of a hydrocarbon-substituted polysiloxane resin and a minor portion of an oil-phenol-aldehyde modified alkyd resin, and (d) a layer of a phenol-aldehyde modified polyvinyl former resin bonded directly to said modified silicone resin layer.

4. The combination of (a) a copper conductor, (b) a copper oxide layer on said conductor prepared by anodic oxidation of said conductor in an aqueous alkaline solution, (c) a layer of a modified silicone resin bonded to said oxide layer, said modified silicone resin comprising a mixture of about 80 parts by weight of a hydrocarbon-substituted polysiloxane resin and about 20 parts by weight of an oil-phenol-aldehyde modified alkyd resin, and (d) a layer of a phenol-aldehyde modified polyvinyl formal resin bonded directly to said modified silicone resin layer.

5. The method of insulating copper wire which consists in first producing on said wire by anodic action in an aqueous alkaline electrolyte a black, adherent film of copper oxide, applying on said film a resinous coating consisting by weight of about 60 to 90 parts silicone resin and 40 to 10 parts of drying oil-phenol-aldehyde-modified alkyd resin, curing said resinous coating to a hard, non-tacky state, applying on such hardened coating a top-coat of a phenol-aldehyde-modified polyvinyl acetal resin, and curing said top-coat.

6. The method of insulating copper wire which consists in first producing on said wire by anodic action in an aqueous alkaline electrolyte a black, adherent film of copper oxide, applying on said film a resinous coating consisting by weight of about 60 to 90 parts of silicone resin and 40 to 10 parts of drying oil-phenol-aldehyde-modified alkyd resin, baking said resinous coating at a temperature in the range of about 240° to 280° C. to convert said coating to a hard, non-tacky state, applying on such hardened coating a top-coat of a phenol-aldehyde modified polyvinyl acetal resin, and again baking at a temperature in the range of about 240° to 280° C. to effectively cure said top coat.

References Cited in the file of this patent

UNITED STATES PATENTS

| | | |
|---|---|---|
| 781,230 | Rodman | Jan. 31, 1905 |
| 2,126,850 | Whitehead | Aug. 16, 1938 |
| 2,307,588 | Jackson et al. | Jan. 5, 1943 |
| 2,349,413 | Hemperly | May 23, 1944 |
| 2,418,932 | Harr | Apr. 15, 1947 |
| 2,523,037 | Mathes | Sept. 19, 1950 |
| 2,593,922 | Robinson et al. | Apr. 22, 1952 |

OTHER REFERENCES

"Metal Finishing," June 1945, pages 247–248.